(12) United States Patent
da Silva et al.

(10) Patent No.: US 9,894,908 B2
(45) Date of Patent: Feb. 20, 2018

(54) RECOVERY OF AVOCADO PASTE FROM AVOCADO OIL MILLING PROCESS OR GUACAMOLE PROCESSING

(71) Applicant: Bella Vado, Inc., Valley Center, CA (US)

(72) Inventors: Corinne da Silva, Valley Center, CA (US); Ciriaco da Silva, Valley Center, CA (US)

(73) Assignee: Bella Vado, Inc., Valley Center, CA (US)

( * ) Notice: Subject to any disclaimer, the term of this patent is extended or adjusted under 35 U.S.C. 154(b) by 23 days.

(21) Appl. No.: 14/846,744

(22) Filed: Sep. 5, 2015

(65) Prior Publication Data
US 2017/0064973 A1   Mar. 9, 2017

(51) Int. Cl.
| A23B 7/00 | (2006.01) |
| A23B 7/01 | (2006.01) |
| A23B 7/028 | (2006.01) |
| A23B 7/02 | (2006.01) |
| A23L 19/00 | (2016.01) |

(52) U.S. Cl.
CPC ............. *A23B 7/01* (2013.01); *A23B 7/02* (2013.01); *A23B 7/028* (2013.01); *A23L 19/01* (2016.08); *A23L 19/09* (2016.08); *A23V 2002/00* (2013.01)

(58) Field of Classification Search
CPC .................................. A23B 7/01; A23B 7/028
USPC .................. 99/451, 353, 495, 352, 357, 484
See application file for complete search history.

(56) References Cited

U.S. PATENT DOCUMENTS

| 4,108,052 A * | 8/1978 | Cunningham ............ C12P 7/06 426/244 |
| 4,181,743 A * | 1/1980 | Brumlick .................. A23L 2/08 426/241 |
| 5,135,122 A | 8/1992 | Gross et al. |
| 8,591,971 B2 * | 11/2013 | Law ........................ A23J 3/341 426/59 |
| 2011/0091616 A1* | 4/2011 | Jimenez Mendoza ... A23B 7/01 426/242 |
| 2011/0256277 A1* | 10/2011 | Bows ....................... A23P 30/32 426/242 |
| 2012/0157668 A1 | 6/2012 | Echmann et al. |

FOREIGN PATENT DOCUMENTS

| WO | WO2004100670 A1 | 11/2004 |
| WO | WO2006004388 A1 | 1/2006 |
| WO | WO2007105969 A1 | 9/2007 |
| WO | WO2013098293 A1 | 7/2013 |

OTHER PUBLICATIONS

International Search Report and Written Opinion in PCT Application No. PCT/US2015/048735 dated Dec. 8, 2015.

* cited by examiner

*Primary Examiner* — Reginald L Alexander

(57) ABSTRACT

The present invention is an innovative method, process and mechanism utilizing infrared energy for the process to dry/dehydrate an oil reduced avocado paste or an oil retained avocado paste into dried/dehydrated avocado powders, flakes, or sheets, with no compromise in the nutritional value of the end food product. The present invention is economical, preserves the original color and nutritional content, provides a continuous drying/dehydrating process for the avocado paste, achieves a food product with a long shelf life and easily transportable.

11 Claims, 3 Drawing Sheets

RECOVERY OF AVOCADO PASTE FROM AVOCADO OIL MILLING PROCESS OR GUACAMOLE PROCESSING

CROSS-REFERENCE TO RELATED APPLICATIONS

None.

FIELD

The present disclosure generally relates to the field of the food processing industry, and more particularly to drying/dehydrating oil reduced or oil retained avocado pulp or paste in a continuous process.

BACKGROUND

The current problem is how to effectively dry/dehydrate the output from a wet milling operation, through a continuous process, while maintaining the integrity of the original food without corrupting its nutritional value. The inventors first encountered this problem while investigating ways to recover avocado pulp, a byproduct of avocado oil extraction, into a stable form with a long shelf life and easily transportable. The inventors considered freezing the wet milling pulp but it was ruled out as impractical and too expensive.

Drying the avocado pulp seemed to be the only viable alternative to achieve a food product with a long shelf life and easily transportable, and also meet other important criteria, including: preservation of nutritional content, original color, long shelf life and be produced in an economical continuous fashion.

In searching for processes on drying the avocado pulp, it appears that four main technologies are used in the food drying industry: freeze drying, conventional drying, vacuum drying and osmotic drying.

Freeze drying and conventional drying technologies are the most widely used technologies in the commercial realm. Oven drying, tunnel drying, spray drying and drum drying are considered conventional drying methods, through the direct use of heat, and are extensively used commercially. Some also have used microwaves to dry food, however, this technology falls under the conventional drying realm.

Freeze drying is a costly alternative that requires large amounts of capital to implement and is a high energy consumer during processing. While this method is less intrusive on the integrity of the end product, when compared to conventional methods, three obstacles became evident:
1) Long drying process.
2) Energy intensive due to the freezing of the pulp and operating the vacuums needed to extract water from the frozen matter.
3) Very expensive to implement.

Conventional Drying also suffers from several serious drawbacks.
1) The use of high heat during dehydration has severe affects on the nutritional integrity of the end product
2) Energy intensive process.
3) The process discolors the milled pulp.
4) Harsh chemicals are necessary to clean the drying surfaces during the process.
5) In the case of spray drying it is costly to implement.

Vacuum and Osmotic drying do not lend themselves to the dehydration of wet milled material in a continuous process.

Thus there is a need for methods and apparatus for recovery of milled avocado pulp or paste that can be dried/dehydrated in a continuous fashion with no compromise in the nutritional value of the end food product, and should also be economical and preserve the original pulp color. Also, when reconstituted, maintains the nutritional and sensory profile of the original food product

SUMMARY

The present invention is an innovative method, process and mechanism utilizing infrared energy, such as Refractance Window technology, to dry/dehydrate an oil reduced avocado pulp, a byproduct of avocado oil extraction process, or an oil retained avocado paste, with no compromise in the nutritional value of the end food product. The present invention is economical, preserves the original avocado paste or pulp color and nutritional content, provides a continuous drying/dehydrating process for the avocado paste or pulp, achieves a food product with a long shelf life and is easily transportable.

Refractive Window dehydration is structurally different than the processes described in the Background, as it does not rely on direct heat contact, as conventional drying methods do, nor sublimation, used in freeze drying, since the drying mechanism used in Refractance Window drying solely relies on infrared energy to dehydrate the avocado pulp or paste. These differences are crucial because it enables the preservation of nutritional value and color of the food product while minimizing energy consumption and simplifying the extension of the wet milling operation of avocados in a continuous form.

BRIEF DESCRIPTION OF THE DRAWINGS

The present embodiments may be understood from the following detailed description when read in conjunction with the accompanying drawing. It is emphasized that, the various features of the drawing are not necessarily to scale. On the contrary, the dimensions of the various features may be arbitrarily expanded or reduced for clarity.

DETAILED DESCRIPTION

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The present invention is an innovative method, process and mechanism to dry/dehydrate an avocado pulp or paste. Using different embodiments of the invention, the system and process can dry/dehydrate the avocado pulp or paste of either an avocado oil reduced by-product, or dry/dehydrate an avocado oil retained product. One important aspect of the invention is that the avocado pulp or paste is dried/dehydrated in a fashion with no compromise in the nutritional value of the end food product. It also has to be economical and preserve the original color.

As discussed above, the present invention was developed as a continuous drying/dehydrating process for the avocado pulp to achieve a food product with a long shelf life and easily transportable, and would also meet other important criteria, including: preservation of nutritional content, original color, long shelf life and be produced in an economical fashion.

In order to extend the wet milling process we chose to use a dehydrating process that met all our criteria, it was found that Refractance Window technology would meet the requirements. Refractive Window dehydration is structurally different than the processes described in the Background, as it does not rely on direct heat contact, as conventional drying methods do, nor sublimation, used in freeze drying, since the drying mechanism used in Refractance Window drying solely relies on infrared energy to dehydrate the avocado pulp. These differences are crucial because it enables the preservation of nutritional value and color of the food product while minimizing energy consumption and simplifying the extension of the wet milling operation of avocados in a continuous form.

Some of the embodiments of the present invention disclose the use of oil reduced avocado by-product, other embodiments of the invention can be used to dry/dehydrate virgin oil retained avocado paste. Additional embodiments of the disclosed invention may also be used to dry/dehydrate other foods, such as fruits and vegetables.

Dehydration Process of an Oil Reduced Avocado By-Product

Figure 1:
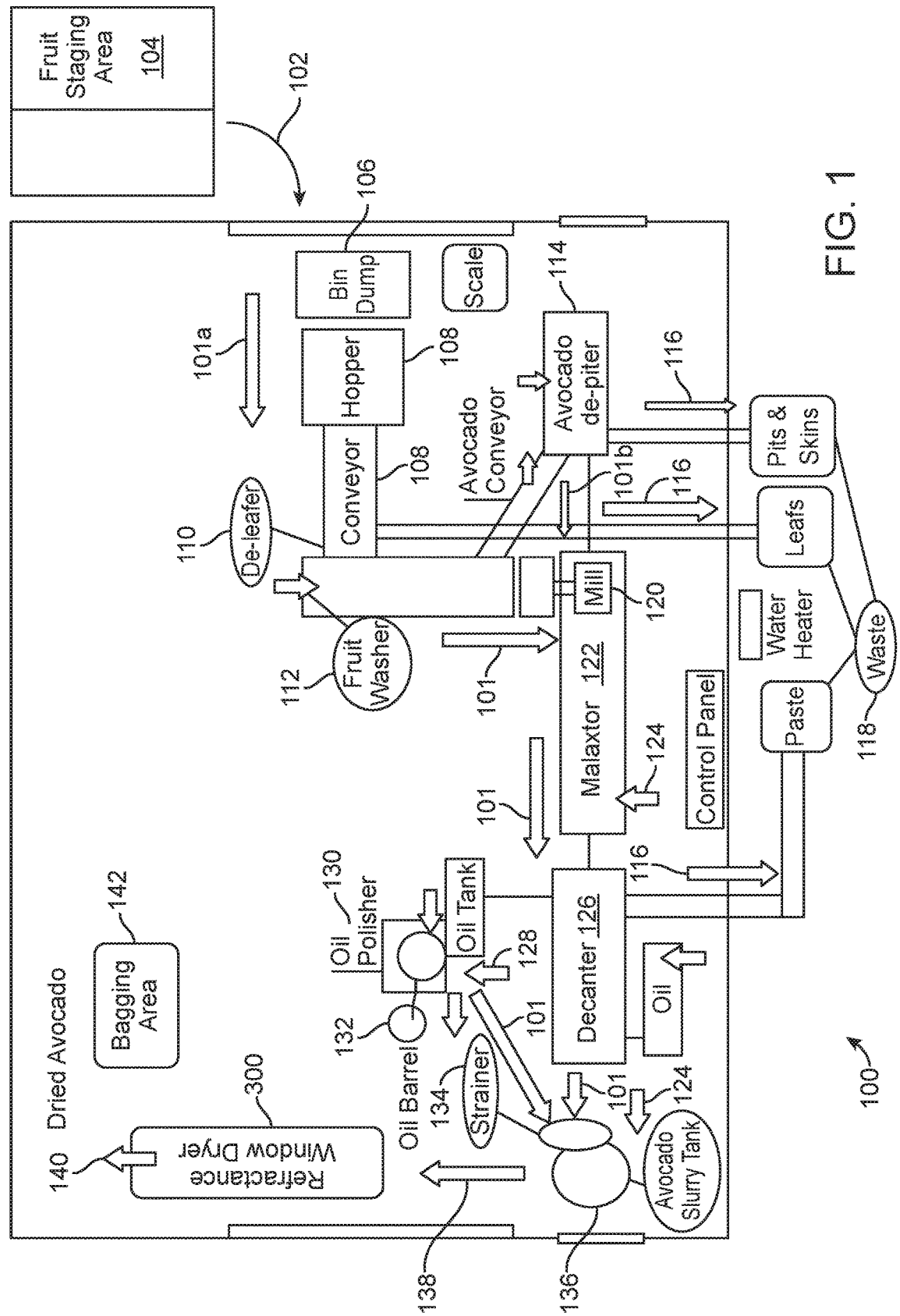
FIG. 1 shows one embodiment of an avocado oil extraction and dehydration process to produce an oil reduced avocado product.

FIG. 1 shows one embodiment of an avocado oil and dehydration process 100 that may be used in the present invention. This embodiment uses an oil reduced by-product of the avocado after the oil is extracted from the avocado.

The process starts by moving 102 the picked avocados 101a from the fruit staging area 104 and loading them in the bin dump 106. The avocados 101 then go through the hopper and conveyor 108 where they are de-leafed 110, washed 112 and de-pitted 114. The leaves, skins and pits are sent 116 to the waste bin 118.

The cleaned avocados 101b are then sent to the mill 120 where they are made into a course avocado paste. The course avocado paste then enters the malaxator 122 where it is continued to be mixed. The process of mixing is known as malaxation. This is an important process to make avocado oil. It helps in bringing microscopic molecules of oil in the avocado paste together to form bigger droplets of oil. Water 124 may be added at this point if needed.

The next step is to separate the oil and water from the malaxed avocado paste. This may be done by pressing the malaxed avocado paste. In the embodiment shown, this pressing is done with a decanter 126, often, a high speed decanting centrifuge. The centrifuge process uses centrifugal force for separating liquids from the solids. The decanter 126 presses the malaxed avocado paste in order to separate the oil and water with the high speed decanting centrifuge, resulting in oil reduced avocado solids. (This process can be used to obtain pure avocado oil 128 without mixing anything else in it.) The high speed decanting centrifuge process may also be used for separating the oil from the water. The oil reduced avocado solids 101 go to the strainer 134 and any waste solids 116 will go to the waste 118. The apparatus rotates at very high speed and in the process the oil 128 makes its way out from one exit and the water 124 from the other exit.

The oil 128 coming from decanter 126 is then polished in an oil polisher 130. This enables the separation of oil from the oil reduced avocado solids and the oil is sent to the oil barrel 132. The oil reduced avocado solids 101 from the decanter 126 and residual oil reduced avocado solids 101 from the oil polisher 130 are then strained 134 forming an oil reduced avocado paste and fed into a slurry tank 136, equipped with kneading paddles. Water 124 is added to the avocado paste, if necessary, to form an oil reduced avocado slurry 138.

The recovery of the avocado paste coming out of wet milling 120, as in avocado oil extraction, is a hard problem to solve because, first, you don't want to destroy this valuable product during a dehydration process and, second, its complexity is overwhelming in light of the energy and financial costs imposed by conventional and freeze drying, which are readily available and well known.

To protect the important qualities of the oil reduced avocado slurry 138 during dehydration, the embodiment shown uses a Refractance Window (RW) system 300 (discussed below). It is one of the gentlest method to dry fresh whole foods. It is a unique, self-limiting dehydration method that uses infra-red light, rather than direct extremes of temperature, to remove water from food. Relying on the conductivity of water together with the properties of infrared and the refractance of light, this is the preferred method for preserving the precious nutrients and phytonutrients found in whole foods. In this process, important sensory qualities of the fresh whole food, such as color, aroma, taste and nutritional value are retained. This is an indicator that the active aromatic and pigment compounds which impart sensory and nutritionally invaluable properties have been preserved throughout the dehydration process. Studies have shown foods dried by Refractance Window drying have a higher retention of vitamins, minerals, enzymes and antioxidants compared to those dried by more commonly practiced methods such as spray or freeze drying.

Once the oil reduced avocado slurry 138 is ready, it is pumped and sprayed onto a Refractance Window drying system 142 (discussed below) dryer belt, which may be made of Mylar or other similar material. The Refractance Window drying system 142 uses infrared energy emitted by hot water, contained under the moving film that removes 98-99% of the water present in the oil reduced avocado slurry 138 as the belt floats past the pool of water. This process lasts 2-4 minutes. The output of this process is a dry oil reduced avocado sheet 140. The dry oil reduced avocado sheet may be collected and broken up into a fine powder and/or bagged for consumption 142.

Dehydration Process of an Oil Retained Avocado Product

Figure 2:
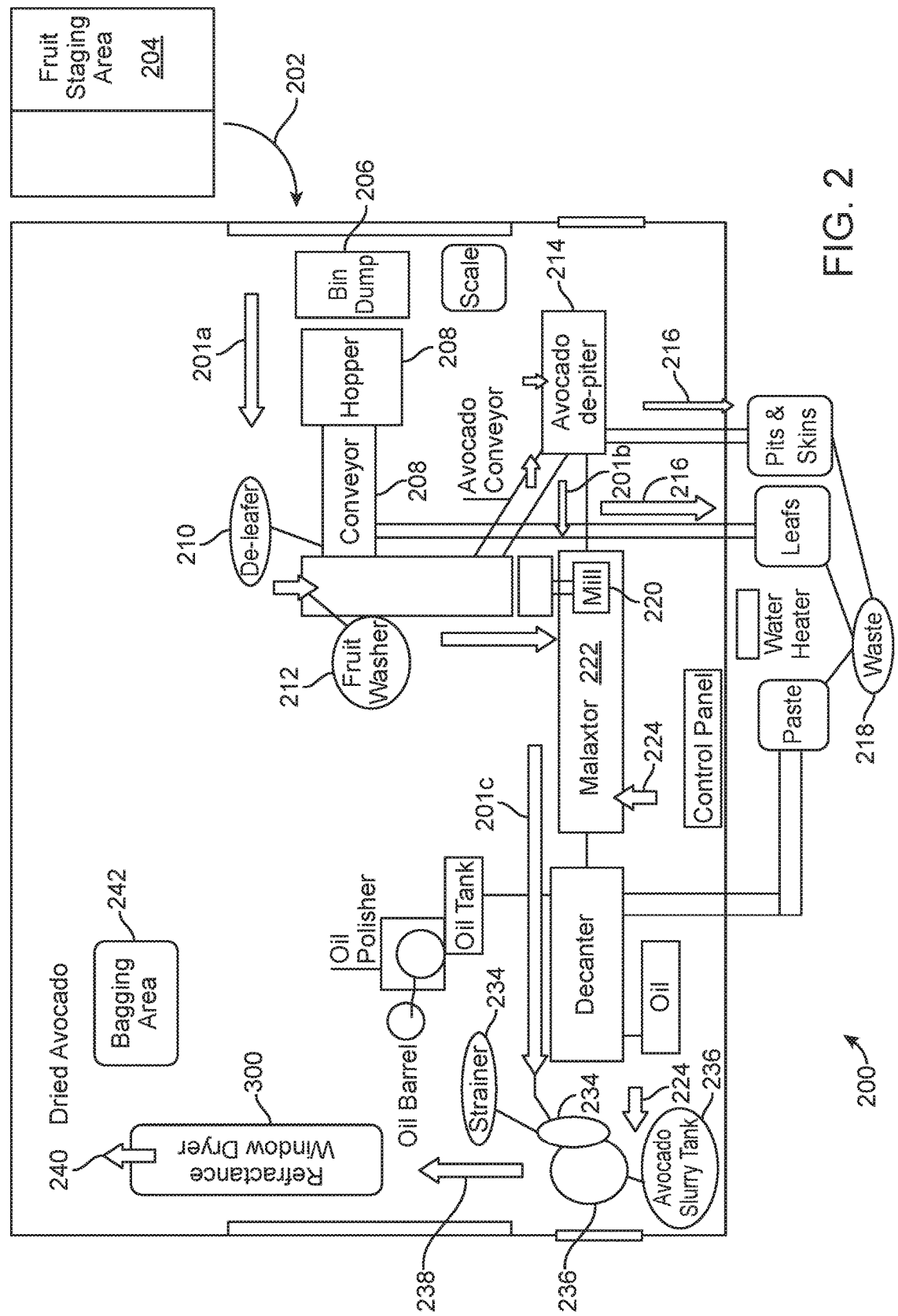
FIG. 2 shows one embodiment of an oil retained avocado dehydration flow process to produce an oil retained avocado product.

FIG. 2 shows another embodiment of an avocado dehydration process 200 of the present invention, which is similar to process 100 shown in FIG. 1, but discloses drying/dehydrating an oil retained avocado paste, bypassing the decanter. By skipping the decanting process, the oil is not removed from the avocado paste in the oil removal stages shown in FIG. 1. The oil retained avocado paste may come from the depitter, mill and/or malaxer and get filtered, then go into the slurry tank The process starts by moving 202 the picked avocados 201a from the fruit staging area 204 and loading them in the bin dump 206. The avocados 201a then go through the hopper and conveyor 208 where they are de-leafed 210, washed 212 and de-pitted 214. The leaves, skins and pits are sent 216 to the waste bin 218.

The cleaned avocados 201b are then sent to the mill 220 where they are made into a course avocado paste. The course avocado paste then enters the malaxator 222 where it is continued to be mixed. The process of mixing is known as malaxation. Water 224 may be added at this point if needed.

The next step is to send the malaxed avocado paste 201c to be strained 234 forming an oil retained avocado paste and fed into a slurry tank 236, equipped with kneading paddles. Water 224 is added to the oil retained avocado paste, if necessary, to form an oil retained avocado slurry 238.

The dehydration of the oil retained avocado slurry 238 coming out of the slurry tank 236 is a hard problem to solve because, first, you don't want to destroy this valuable product during a dehydration process and, second, its complexity is overwhelming in light of the energy and financial costs imposed by convection and freeze drying, which are readily available and well known.

To protect the important qualities of the oil retained avocado slurry 238 during dehydration, the embodiment shown uses a Refractance Window (RW) system 300 (discussed below). It one of the gentlest method to dry fresh whole foods. It is a unique, self-limiting dehydration method that uses infra-red light, rather than direct extremes of temperature, to remove water from food. Relying on the conductivity of water together with the properties of infrared and the refractance of light, this is the preferred method for preserving the precious nutrients and phytonutrients found in whole foods. In this process, important sensory qualities of the fresh whole food, such as color, aroma, taste and nutritional value are retained. This is an indicator that the active aromatic and pigment compounds which impart sensory and nutritionally invaluable properties have been preserved throughout the dehydration process. Studies have shown foods dried by Refractance Window drying have a higher retention of vitamins, minerals, enzymes and antioxidants compared to those dried by more commonly practiced methods such as spray or freeze drying.

Once the oil retained avocado slurry 238 is ready, it is pumped and sprayed onto a Refractance Window drying system 300 dryer belt, made of Mylar or similar material. The Refractance Window drying system 300 uses infrared energy emitted by hot water, contained under the moving film that removes 98-99% of the water present in the oil retained avocado slurry 338 as the belt floats past the pool of water. This process lasts 2-4 minutes. The output of this process is a dry oil retained avocado sheet 240. The dry oil retained avocado sheet 240 may be collected and broken up into a fine powder and/or bagged for consumption 242.

Avocado Dehydration Using Refractance Window Drying System

Figure 3:
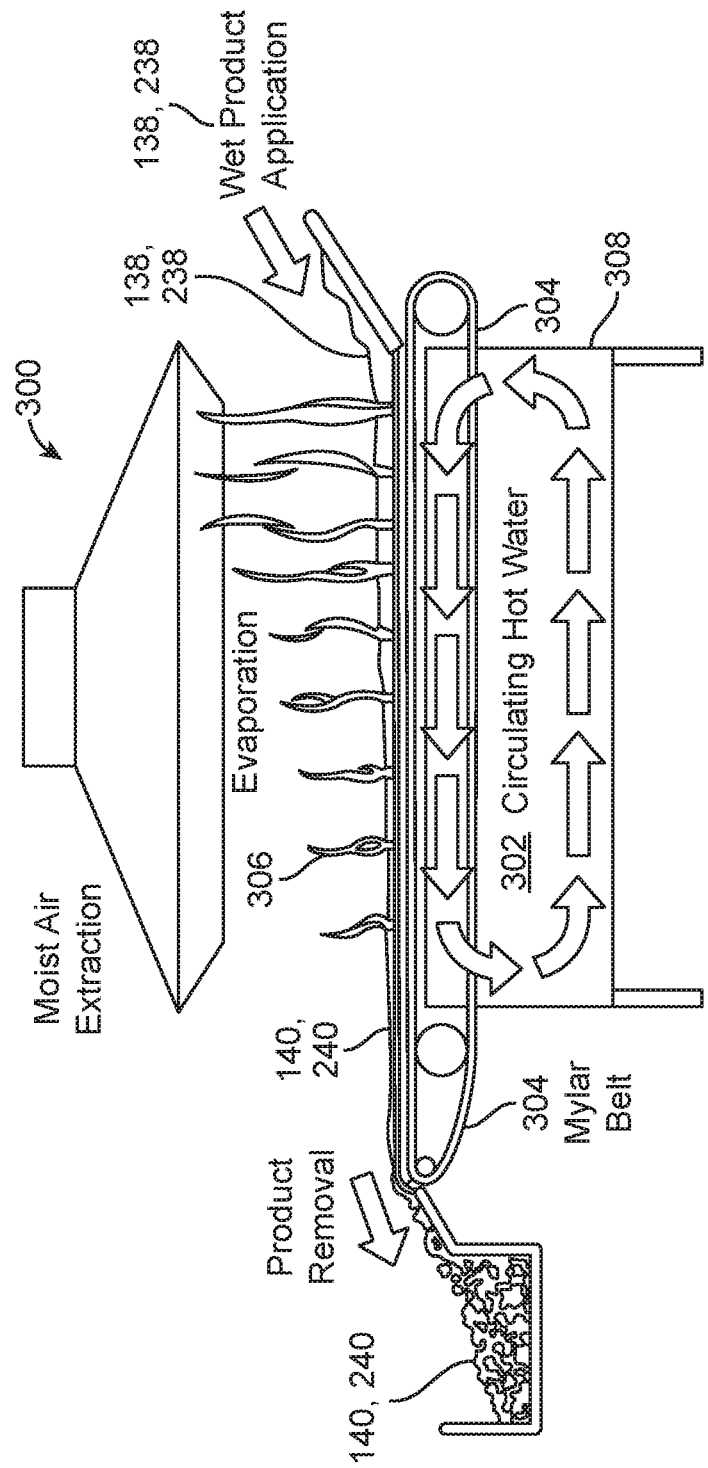
FIG. 3 shows one embodiment of avocado dehydration using Refractance Window drying System.

FIG. 3 shows one example of a Refractance Window (RW) dehydration system 300 that is a novel method drying/dehydrating oil reduced avocado slurry 138 and/or oil retained avocado slurry 238 into powders, flakes, or sheets with added value. In the RW dehydration system 300, the drying/dehydrating process lasts 2-4 minutes, resulting in dryed/dehydrated oil reduced avocado sheets 140 and/or oil retained avocado sheets 240 with excellent color, vitamin, and antioxidant retention.

The RW dehydration system 300 is simple and relatively inexpensive when compared with freeze drying, which usually needs large installations to be economical. In RW dehydration system 300, thermal energy is transferred from hot water 302 to a film of avocado slurry 138, 238 spread thinly on a plastic conveyor belt 304. When water is placed over a heating source, infrared energy is transferred throughout the water by convection. The heat energy then radiates from the water, primarily through evaporation 306. When water is covered by a transparent membrane, such as Mylar or plastic, and placed over a heating source, evaporation and its associated heat loss are blocked or "refracted," and only conduction occurs. The plastic membrane acts like a mirror reflecting the infrared energy back into the water.

When the avocado slurry 138, 238 is placed on the plastic membrane's surface 304, the water in the material creates a "window" that allows for the passage of infrared energy through the avocado slurry 138, 238. Heat behaves as if there were no membrane present, and is directly transferred to the water remaining in the avocado slurry 138, 238. In moments, the water in the avocado slurry 138, 238 on the plastic membrane's surface evaporates 306, removing 98-99% of the water present in the avocado slurry 138, 238, and the "window" of infrared energy closes and "refracts" back into the heated water source, no longer exposing the avocado slurry 138, 238 to heat.

In the present invention, during the Refractance Window drying process, once the avocado slurry 138, 238 is ready, it is applied to the surface of the Refractance Window drying system's conveyor belt 304. The belt is a food grade Mylar (transparent polyester film) floating on the surface of a heated cistern 308 containing circulating hot water 302.

The heat from the cistern's water is conducted, by way of a "refractance window," through the Mylar belt to the water present in the avocado slurry 138, 238 laying on the belt. As the avocado slurry 138, 238 travels down the conveyor, the water in the material evaporates through the "window" in a matter of moments, with the "window" closing in proportion to the rapid dissipation of water. Because the Mylar conveyor belt is a poor heat conductor, once the avocado slurry 138, 238 dries into the dryed/dehydrated oil reduced avocado sheet 140 and/or oil retained avocado sheet 240, the "refractance window" closes, and only a miniscule amount of heat is transferred to the product as it is carried to the end of the conveyor system.

The oil reduced avocado slurry 138 and/or oil retained avocado slurry 238 dried through the RW process delivers an oil reduced avocado sheet 140 and/or oil retained avocado sheet 240 close to its natural state. This expedient dehydration method protects the avocado's delicate nutrients, color and flavor. Because the Refractance Window drying process maintains the temperature of the avocado slurry 138, 238 far below the temperature of the water circulating beneath the conveyor belt, its precious nutrients are protected from oxidization. During the process, heat is applied to the avocado slurry 138, 238 in the range or about 72° C. for only two to four minutes.

When comparing various dehydration technologies, the degree of preservation of a material's original color and flavor indicates the quality of the dehydration process utilized. Studies performed at Washington State University's Department of Biological Systems Engineering and Department of Food Science and Human Nutrition established the preservation superiority of the Refractance Window drying technology over all other methods of dehydration, including freeze-drying and spray-drying methods in the preservation of the natural state of the moist raw material. Freeze-drying techniques expose raw material to heat ranging from 30° C. to 64° C. for twenty-four straight hours. Spray-drying techniques apply heat to raw material ranging from 150° C. to 300°. Both methods can cause significant nutritional loss to the raw material being dried.

Drying/Dehydration Testing of Decanter Waste

In order to extend the wet milling process, and recover the decanter waste with a dehydrating process that met all our criteria, Refractance Window technology was tested. Refractance Window technology is structurally different than many of the other processes described in the Background as it relies solely on infrared energy to dehydrate the avocado wet milled by-product. Refractance Window technology does not rely on direct heat contact, as conventional drying methods do, nor sublimation, used in freeze drying. These differences are crucial because it enables the preservation of the nutritional value and color of the avocado food product while minimizing energy consumption and simplifying the extension of the wet milling operation in a continuous form.

During testing it was observed that the Refractance Window process removed between 96-97% of the moisture in the avocado wet milled by-product pulp in under 3 minutes and it was done in a continuous feed fashion. Not only was it fast, the avocado flaked end product retained its color and was preserved under room temperature conditions with no observable deterioration. In other words, it exceeded our expectations. We also determined that this technology could easily be used to dry other wet milled by-products.

While the present teachings are described in conjunction with various embodiments of avocado wet milled by-product, it is not intended that the present teachings be limited to such embodiments. On the contrary, the present teachings could easily be used to dry other wet milled by-products using various alternatives, modifications, and equivalents, as will be appreciated by those of skill in the art.

Further, in describing various embodiments, the specification presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The terms and expressions that have been employed are used as terms of description and not of limitation, and there is no intent in the use of such terms and expressions to exclude any equivalent of the features reported and described or portions thereof, but it is recognized that various modifications are possible within the scope of the present embodiments as claimed. Thus, it will be understood that although the present embodiments have been specifically disclosed herein, modification and variation of the concepts herein disclosed may be resorted to by those skilled in the art, and that such modifications and variations are considered to be within the scope of the present embodiments as defined by the appended claims.

The invention claimed is:

1. An apparatus for producing dried/dehydrated avocado powders, flakes, or sheets, comprising:
    a) a cleaning system configured to removing leaves, pits and hull from avocados, forming cleaned avocados;
    b) a milling system configured to mill the cleaned avocados into an avocado paste;
    c) one or more oil extraction systems configured to separate avocado oil from the avocado paste, ending up with avocado oil and a byproduct of oil reduced avocado paste;
    d) a slurry device configured to knead the avocado paste to form an avocado slurry;
    e) a moving drying belt configured to receive the avocado slurry; and
    f) an infrared energy device configured to subject the avocado slurry to infrared energy while on the moving drying belt to remove water present in the avocado slurry to dry/dehydrate the avocado slurry into dried/dehydrated avocado powders, flakes, or sheets;
    wherein the dried/dehydrated avocado powders, flakes, or sheets resulting from oil reduced avocado paste result in oil reduced avocado powders, flakes, or sheets.

2. The apparatus according to claim 1, further comprising a collection area to receive the dried/dehydrated avocado powders, flakes, or sheets from the infrared energy device.

3. The apparatus according to claim 1, further comprising a straining system configured to strain the avocado paste positioned prior to the slurry device.

4. The apparatus according to claim 1, wherein the infrared energy device is configured to subject the avocado slurry to two to four minutes of infrared energy while on the moving drying belt to remove 98-99% of any water present in the avocado slurry.

5. The apparatus according to claim 1, wherein the infrared energy device is configured to provide heat in the range or about 72° C. for two to four minutes.

6. An apparatus for producing dried/dehydrated avocado powders, flakes, or sheets, comprising:
    a) a cleaning system configured to removing leaves, pits and hull from avocados, forming cleaned avocados;
    b) a milling system configured to mill the cleaned avocados into an avocado paste;
    c) a straining system configured to strain the avocado paste;
    d) a slurry device configured to knead the avocado paste to form an avocado slurry;
    e) a moving drying belt configured to receive the avocado slurry; and
    f) an infrared energy device configured to subject the avocado slurry to infrared energy while on the moving drying belt to remove water present in the avocado slurry to dry/dehydrate the avocado slurry into dried/dehydrated avocado powders, flakes, or sheets.

7. The apparatus according to claim 6, wherein the dried/dehydrated avocado powders, flakes, or sheets are oil retained powders, flakes, or sheets.

8. The apparatus according to claim 6, further comprising:
    one or more oil extraction systems configured to separate avocado oil from the avocado paste, ending up with avocado oil and a byproduct of oil reduced avocado paste, the one or more oil extraction systems being positioned between the milling system and slurry device;
    wherein the dried/dehydrated avocado powders, flakes, or sheets resulting from oil reduced avocado paste result in oil reduced avocado powders, flakes, or sheets.

9. The apparatus according to claim 6, further comprising a collection area to receive the dried/dehydrated avocado powders, flakes, or sheets from the infrared energy device.

10. The apparatus according to claim 6, wherein the infrared energy device is configured to subject the avocado slurry to two to four minutes of infrared energy while on the moving drying belt to remove 98-99% of any water present in the avocado slurry.

11. The apparatus according to claim 6, wherein the infrared energy device is configured to provide heat in the range or about 72° C. for two to four minutes.

* * * * *